US008325660B2

(12) United States Patent
Shinozaki (10) Patent No.: US 8,325,660 B2
(45) Date of Patent: Dec. 4, 2012

(54) COMMUNICATION RESOURCE MANAGEMENT DEVICE

(75) Inventor: Atsushi Shinozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 457 days.

(21) Appl. No.: 12/545,491

(22) Filed: Aug. 21, 2009

(65) Prior Publication Data

US 2009/0310557 A1    Dec. 17, 2009

Related U.S. Application Data

(63) Continuation of application No. 11/063,465, filed on Feb. 23, 2005, now Pat. No. 8,023,514, which is a continuation of application No. PCT/JP03/00602, filed on Jan. 23, 2003.

(51) Int. Cl.
*H04W 4/00* (2009.01)
(52) U.S. Cl. .................... 370/329; 370/341; 370/342
(58) Field of Classification Search .............. 370/468, 370/395.4, 395.41, 342, 329, 341, 441, 335, 370/431; 455/450, 509, 464, 517, 452.1, 455/451, 512, 453, 516, 527
See application file for complete search history.

(56) References Cited

U.S. PATENT DOCUMENTS

| | | | |
|---|---|---|---|
| 6,018,528 A | 1/2000 | Gitlin et al. | |
| 6,064,662 A * | 5/2000 | Gitlin et al. | 370/330 |
| 6,208,624 B1 | 3/2001 | Tanno et al. | |
| 6,374,112 B1 | 4/2002 | Widegren et al. | |
| 6,473,419 B1 | 10/2002 | Gray et al. | |
| 6,788,659 B1 * | 9/2004 | Sato | 370/329 |
| 6,804,219 B2 | 10/2004 | Koo et al. | |
| 7,236,787 B1 | 6/2007 | Tamura et al. | |
| 2001/0017882 A1 | 8/2001 | Umeda et al. | |
| 2001/0024431 A1 | 9/2001 | Koo et al. | |
| 2002/0173327 A1 | 11/2002 | Rosen et al. | |

FOREIGN PATENT DOCUMENTS

CN      1253680       5/2000

(Continued)

OTHER PUBLICATIONS

United States Office Action dated Aug. 31, 2010, from corresponding U.S. Appl. No. 11/063,465.

(Continued)

*Primary Examiner* — Kibrom T Hailu
*Assistant Examiner* — Dady Chery
(74) *Attorney, Agent, or Firm* — Katten Muchin Rosenman LLP (57) ABSTRACT

A communication resource management device is capable of changing the transfer rate of a control channel related to a mobile terminal in accordance with the communication condition. The device determines whether to change the transfer rate of a first control channel related to a first mobile terminal; determines whether there is a frequency band for which it is not determined whether the frequency band is to be used in a predetermined time period based on the current transfer rate of a second control channel related to a second mobile terminal and an amount of data of signals to be transmitted in the second control channel; and allocates, to the first mobile terminal, at least a part of the frequency band for the second control channel with respect to the second mobile terminal in a predetermined period of time based on a positive decision result. The device changes the transfer rate in the first control channel while maintaining the total frequency band for plural control channels related to plural mobile terminals at a constant value.

3 Claims, 10 Drawing Sheets

FOREIGN PATENT DOCUMENTS

| | | |
|---|---|---|
| EP | 0680168 | 11/1995 |
| EP | 0 887 948 | 12/1998 |
| EP | 0959634 | 11/1999 |
| EP | 0978958 | 2/2000 |
| EP | 1018811 | 7/2000 |
| JP | 7303090 | 11/1995 |
| JP | 9083471 | 3/1997 |
| JP | 9172670 | 6/1997 |
| JP | 1042355 | 2/1998 |
| JP | 10200951 | 7/1998 |
| JP | 2000201173 | 7/2000 |
| JP | 3282708 | 3/2002 |
| JP | 2002542659 | 12/2002 |
| WO | 9848528 | 10/1998 |
| WO | 9952307 | 10/1999 |
| WO | 0062456 | 10/2000 |
| WO | 0150637 | 7/2001 |

OTHER PUBLICATIONS

European Communication pursuant to Article 94(3) EPC dated Dec. 16, 2010, from corresponding European Application.
United States Office Action dated Feb. 28, 2011, from corresponding U.S. Appl. No. 11/063,465.
International Search Report dated May 20, 2003.
European Search Report dated Sep. 25, 2007 from the corresponding European Patent Application.
Chinese Office Action dated Oct. 12, 2007, from the corresponding Chinese Patent Application.
Non-final Office Action dated Mar. 17, 2008 from corresponding U.S. Appl. No. 11/063,465.
Japanese Office Action dated Feb. 22, 2008 from the corresponding Japanese Application.
Non-final Office Action dated Mar. 17, 2008 from the corresponding U.S. Appl. No. 11/063,465.
Final Office Action dated Oct. 9, 2008, from the corresponding U.S. Appl. No. 11/063,465.
Non-final Office Action dated Feb. 23, 2009, from the corresponding U.S. Appl. No. 11/063,465.

* cited by examiner

COMMUNICATION RESOURCE MANAGEMENT DEVICE

BACKGROUND OF THE INVENTION

1. Field of the Invention

The present invention generally relates to devices for managing communication resources, and more particularly, to a communication resource management device for varying the transfer rate of a control channel.

2. Description of the Related Art

A user of a mobile terminal in a mobile communication system can communicate with a desired party by using a communication channel (or information channel) that is set for each call. Setting and management of the communication channel are performed via a control channel. In this case, the data transfer capacity required for the control channel generally differs for each communication system or network. Thus, in terms of effective use of communication resources, it is preferred that allocation of communication resources for the control channel be modified for each communication system.

In regard to this point, Japanese Patent No. 3282708 discloses a technique for improving the efficiency in using communication resources by setting, for each network, an appropriate quantitative ratio on a time axis of the control channel to the information channel. A wireless terminal in this case can establish a connection to any network having a different channel structure by appropriately selecting an operational mode corresponding to each network. However, even within the same mobile communication system, the transfer capacity and/or traffic volume required for the control channel are not always the same. For example, generally, the number of control steps and the transfer quantity of control information are large at the time of connecting a call, but they are reduced during the connection. Thus, conventional techniques such as mentioned above include problems in that it is impossible to flexibly handle such a communication condition.

On the other hand, in a CDMA (Code Division Multiple Access) communication system based on the specification of the 3GPP (3rd Generation Partnership Project), a predetermined transmission band (transfer rate) is assigned for each control channel, and a fixed transfer rate in the control channel is guaranteed in each network. When improving the transfer rate in the control channel related to a certain mobile terminal, a further transmission band is allocated to the mobile terminal without modifying the allocation of transmission band with respect to the control channels of other mobile terminals. Thereby, the data amount that can be transferred within a given length of time is increased in the control channel, and it becomes possible to improve the communication speed. A description of such a condition is given with reference to FIG. 1.

Figure 1:
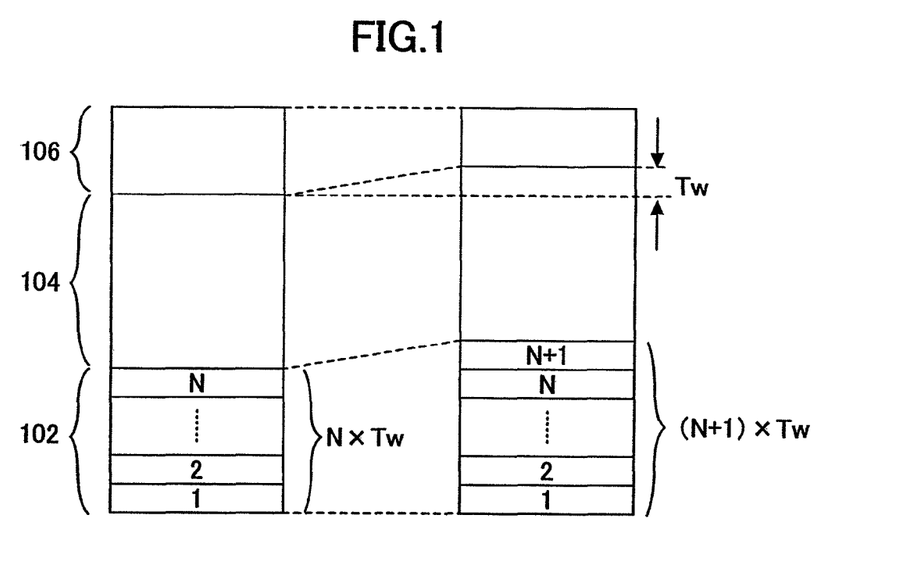
FIG. 1 is a schematic diagram showing a breakdown of transmission bands that can be used in a mobile communication system.

As shown in the left side of FIG. 1, among the available transmission bands in an entire mobile communication system, a part thereof is used for control channels (102), another part thereof is used for a communication channel (104), and the remaining part is empty transmission bands (106). For example, it is assumed that, in order to guarantee a fixed transfer rate with respect to N mobile terminals, a Tw transmission band is allocated to the control channel for each of the mobile terminals, and N×Tw transmission band resources are used for the control channels (102) in the entire system. If two (2×Tw) transmission bands are allocated to a certain mobile terminal in order to improve the transfer rate of the control channel for the mobile terminal, as shown in the right side of FIG. 1, the transmission bands used for the control channels are (N+1)×Tw in the entire system. Since the mobile terminal can use 2×Tw transmission bands, it becomes possible to improve the transfer rate in the control channel.

However, when the transfer rate is improved in the aforementioned manner, since the transmission bands allocated in a fixed manner are increased among the available transmission bands in the entire system, a problem occurs in that the unused bands 106 are reduced. It should be noted that the communication channels 102 include fixed transmission bands necessary for providing various services offered in the mobile communication system, such as an audio channel.

When the unused bands 106 are reduced, first, the number of users that can be further handled in the system is decreased. In addition, since the empty transmission bands vary in accordance with variation in the transmission bands occupied by the control channels, it becomes necessary to perform transmission band management including, for example, monitoring of the empty transmission bands. Consequently, there is a problem in that, for example, management costs in a wireless base station and a radio network controller (RNC) are increased. Further, since it is necessary to, for example, design a system and conduct business investment in consideration of the above-mentioned aspects, there is a problem in that system building is not necessarily easy.

SUMMARY OF THE INVENTION

A general object of the present invention is to provide an improved and useful communication resource management device in which one or more of the above-mentioned problems are eliminated.

Another and more specific object of the present invention is to provide a communication resource management device capable of effectively using communication resources by varying the transfer rate of a control channel associated with a mobile terminal in accordance with the communication state.

A further object of the present invention is to provide a communication resource management device capable of varying the transfer rate in a communication channel associated with a mobile terminal without modifying the sum of the respective transmission bands of communication channels allocated to plural mobile terminals.

The above-mentioned objects are achieved by the means mentioned below. According to the present invention, there is provided a communication resource management device managing transmission bands for a plurality of control channels related to a plurality of mobile terminals including at least first and second mobile terminals, the communication resource management device including: first determination means for determining whether to change a transfer rate of a first control channel related to the first mobile terminal; and allocation means for allocating, to the first mobile terminal, a transmission band for a second control channel with respect to the second mobile terminal in a period of time based on a decision result of the first determination means, the decision result indicating change should be made.

Other objects, features and advantages of the present invention will become more apparent from the following detailed description when read in conjunction with the following drawings.

DETAILED DESCRIPTION OF THE PREFERRED EMBODIMENTS (First Embodiment)

Figure 2:
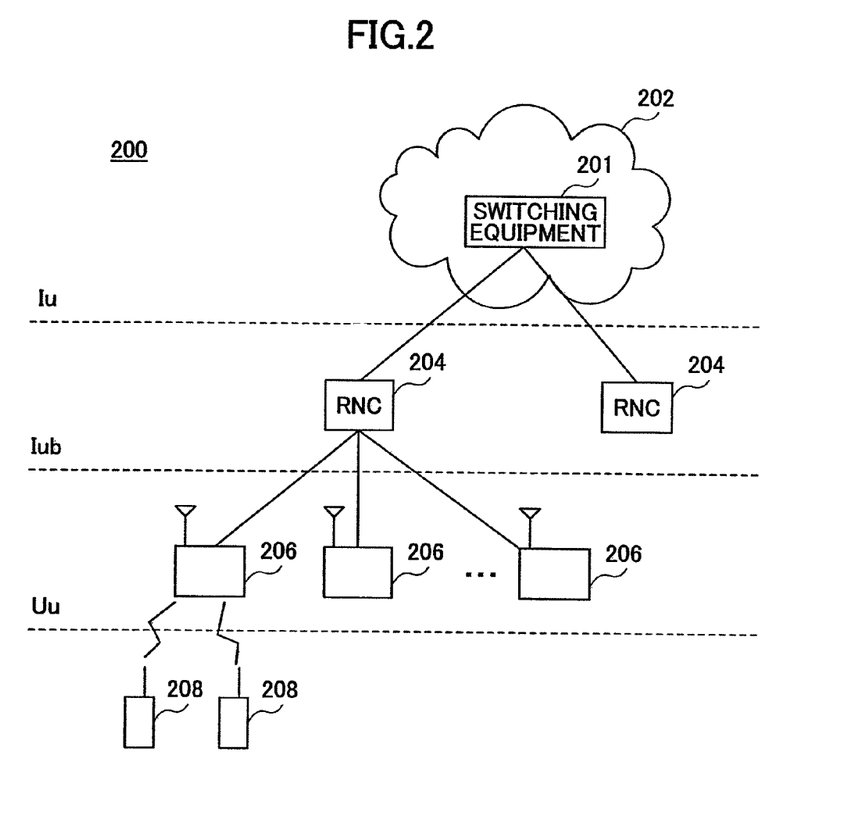
FIG. 2 is a schematic diagram of a mobile communication system to which the present invention may be applied.

FIG. 2 is a schematic diagram of a mobile communication system 200 to which the present invention may be applied. The mobile communication system 200 is, for example, a CDMA communication system based on the specification of the 3GPP. The mobile communication system 200 includes a network 202 such as the Internet, and the network 202 is provided with switching equipment 201 for establishing a connection with another communication system such as a fixed telephone network. The mobile communication system 200 includes radio network controllers (RNCs) 204 connected to the network 202. Each radio network controller 204 controls plural wireless base stations 206 connected thereto. Each of the wireless base stations 206 performs radio communications with a mobile terminal 208 that belongs to its own region (cell). Allocation of communication resources such as the transmission bands (transfer rates) for mobile phones is managed by the radio network controller 204. In FIG. 2, Iu indicates the interface between the switching equipment 201 in the network 202 and the radio network controllers 204. Iub indicates the interface between the radio network controllers 204 and the wireless base stations 206. Uu indicates the interface between the wireless base stations 206 and mobile terminals 208.

Figure 3:
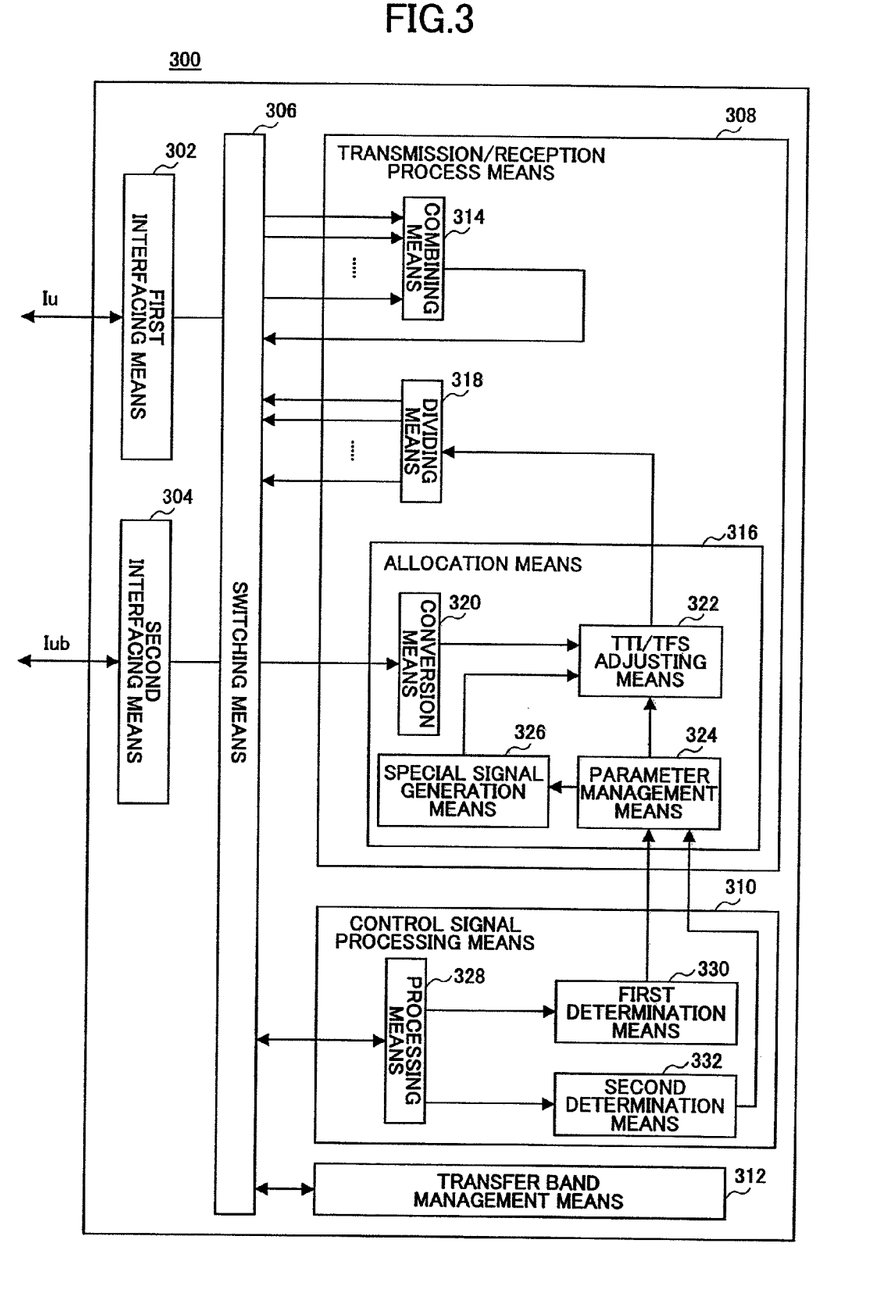
FIG. 3 is a block diagram of major functions of a communication resource management device according to an embodiment of the present invention.

FIG. 3 is a block diagram regarding major functions of a communication resource management device according to one embodiment of the present invention. For convenience of explanation, the communication resource management device 300 of this embodiment is provided in the radio network controller 204. However, this is not fundamental to the present invention, and the communication resource management device 300 may be provided separately from the radio network controller 204. It should be noted that FIG. 3 shows major blocks related to control channels, which are particularly important in the present invention, and those blocks related to processing of communication channels are omitted.

The communication resource management device 300 includes first interfacing means 302 for communications with the higher switching equipment 201, and second interfacing means 304 for communications with the lower wireless base stations 206. The first and second interfacing means 302 and 304 include switching means 306 for appropriately delivering signals in the communication resource management device 300. The communication resource management device 300 includes transmission/reception process means 308, control signal processing means 310, and transmission band management means 312, which are coupled to the switching means 306.

The transmission/reception process means 308 include combining means 314 for receiving control signals (signals transferred in control channels) from respective mobile terminals via the first or second interfacing means 302 or 304, respectively, and the switching means 306 as plural sequences of signals, and converting them into a single signal sequence. The output of the combining means 314 is connected to the switching means 306. The transmission/reception process means 308 include allocation means 316 for determining how to transfer a control signal for each mobile terminal to a wireless base station, and dividing means 318 for dividing an output signal of the allocation means 316 into plural signal sequences for transferring.

The allocation means 316 include conversion means 320 for converting the format of a control signal to be transferred to a mobile terminal to a signal format for the Iub from the signal format for delivering within the communication resource management device 300. The output of the conversion means 320 is connected to transmission time interval/size adjusting means 322 for adjusting the transmission time interval (TTI) of a signal or the size of data to be transferred at a time at each transmission cycle (TFS: Transport Format Set). The output of the transmission time interval/size adjusting means 322 is connected to the dividing means 318. The adjustment in the transmission time interval/size adjusting means 322 is set under control of parameter management means 324 for managing a parameter that specifies, for example, the transmission time interval. Further, the allocation means 316 include special signal generation means 326 for generating a special signal (signal having only an Iub header) to be transmitted to a mobile terminal in the case where a transmission block (TB) to be transmitted to the mobile terminal does not exist.

The control signal processing means 310 include processing means 328 for receiving an output signal of the combining means 314 via the switching means 306 and performing, for example, analysis and determining of the control signal. In addition, the processing means 328 may be used for generating a control signal transmitted to the mobile terminal. The control signal processing means 310 include first determination means 330 for determining whether to vary the transfer rate of the control channel according to need (for example, in accordance with the kind and/or amount of data of a signal to be transmitted). Preferably, the control signal processing means 310 further include second determination means 332 for determining whether there are unused communication resources (transmission bands) in a certain period based on the transfer rate (currently) set to the control channel and the amount of data of a signal to be actually transmitted via the control channel. That is, it is also possible to consider the decision result of the second determination means 332 when determining whether to vary the transfer rate in the first determination means 330. The decision result in the second determination means 332 is also given to allocation means 316 (the parameter management means 324).

The transmission band management means 312 control allocation and releasing of transmission bands for control channels of mobile terminals that are used in the mobile communication system based on the transmission bands (or the remaining transmission bands) of the control channels currently being used. In addition, the transmission band management means 312 serve a predetermined notice to switching equipment and/or wireless base stations in accordance with an increase/decrease of the unused bands.

Figure 4:
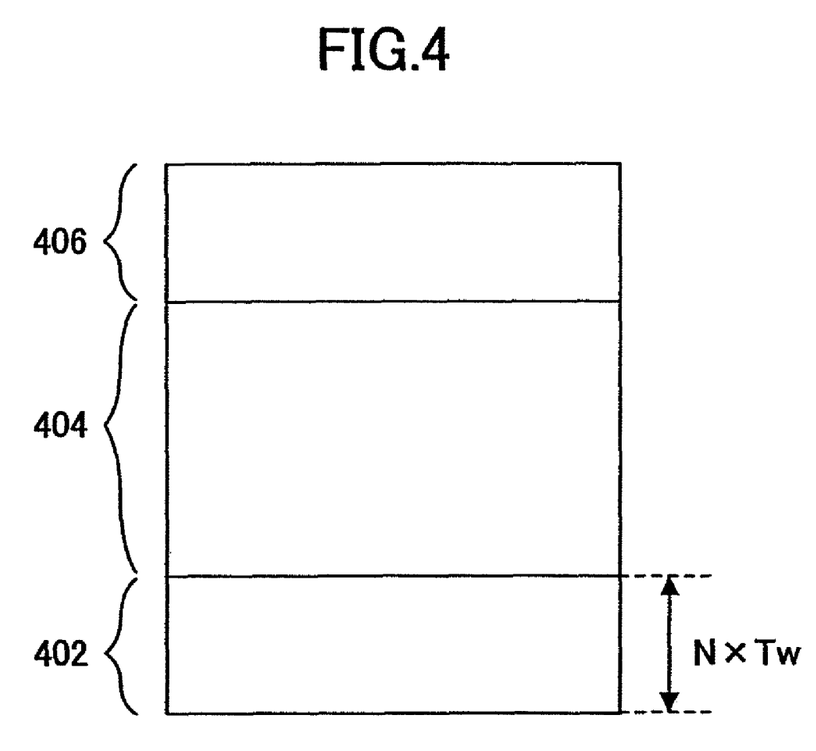
FIG. 4 is a schematic diagram showing a breakdown of transmission bands that can be used in the mobile communication system.
Figure 5:
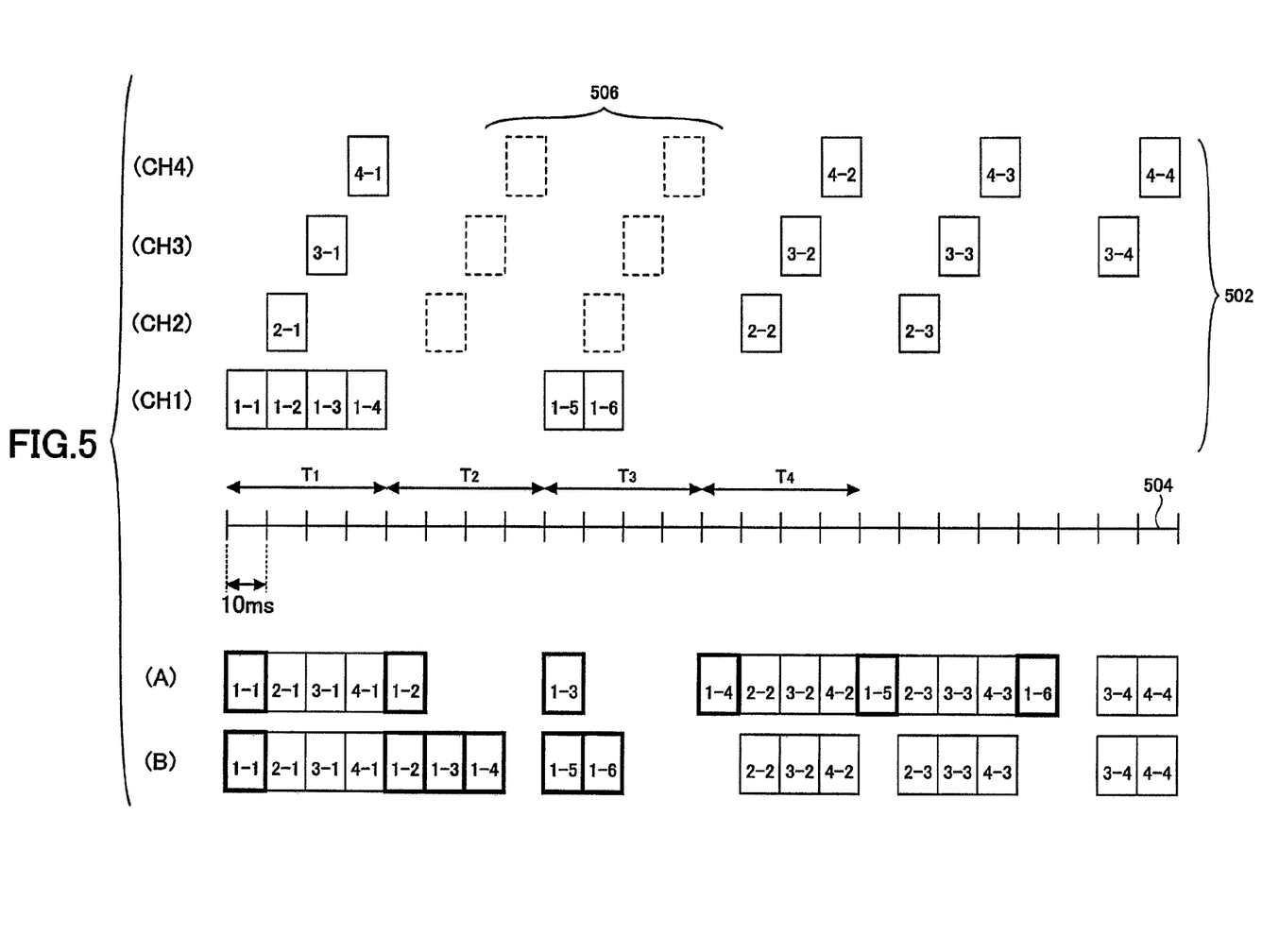
FIG. 5 is a diagram for explaining how transmission blocks to be transferred in respective control channels are transferred on a time axis.
Figure 6:
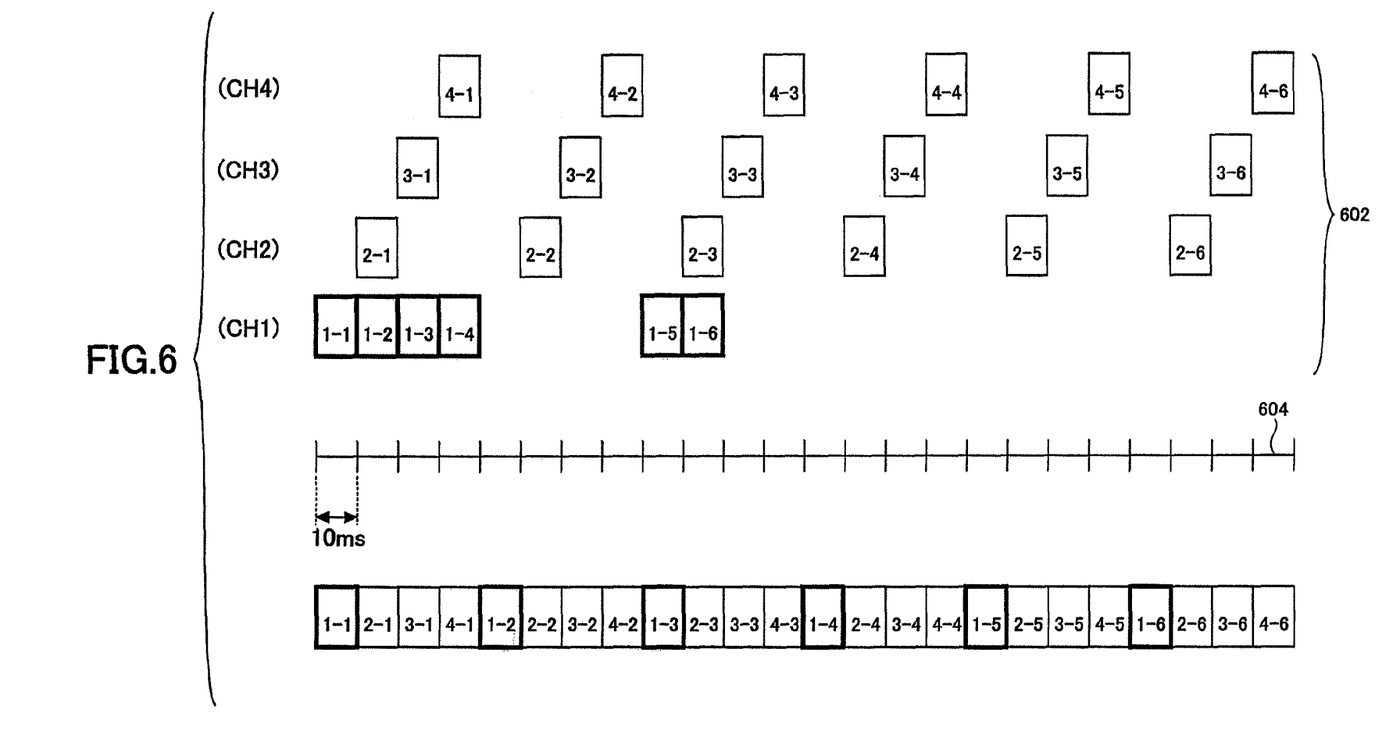
FIG. 6 is another diagram for explaining how transmission blocks to be transferred in respective control channels are transferred on a time axis.

Referring to FIGS. 4, 5 and 6, a description is given of an operation of the communication resource management device 300. FIG. 4 is a schematic diagram showing a breakdown of transmission bands in the mobile communication system. Similar to FIG. 1, among the available transmission bands in the entire system, a part thereof is used for a control channel 402, another part thereof is used for a communication channel 404, and the remaining part thereof is an unused band 406. However, in this embodiment, even if the transfer rate of the control channel for a certain mobile terminal is varied, unless the number (N) of mobile terminals that perform communications by using control channels is varied, the amount of the transmission band 402 occupied by the control channels is maintained constant among the available transmission bands in the entire system. The transmission bands maintained constant are expressed by N×Tw, where N is the number of mobile terminals that perform communications by using control channels, and Tw is the lowest transfer rate set and guaranteed in the mobile communication system in a case where each mobile terminal performs communications by using a control channel. N and Tw are used for the same meanings as described with reference to FIG. 1. Thus, in a case where each mobile terminal performs communications via its own control channel, as in conventional cases, each mobile terminal uses a band of Tw.

Meanwhile, in each control channel in uplinks and downlinks, data equal to or less than a predetermined data size (TFS) are transferred at predetermined transmission time intervals. In this case, each control channel does not necessarily transmit data at all of the predetermined transmission time intervals. There may be a period during which data to be transmitted as a control signal do not exist, that is, there is an unused communication resource that is not being used for data transmission.

In this embodiment, such an unused communication resource is found out and allocated to a control channel related to another mobile terminal, thereby increasing the transfer rate of the communication channel. Accordingly, it becomes possible to correspond to the demand for high-speed control channels, and in addition, those communication resources the use of which is not determined are used for other control channels. Hence, communication resources can be effectively used. Further, since all the transmission bands 402 for control channels are maintained constant among the available transfer channels in the entire system, it is possible to avoid reducing the transmission bands 404 for communication channels and the remaining transmission bands 406. Accordingly, it is possible to eliminate various problems caused by reducing the remaining transmission bands 406.

FIG. 5 shows how transmission blocks 502 (1-1, 1-2, ..., 1-6, 2-1, ..., 4-4), which should be transmitted via corresponding four control channels CH1 through CH4 are transferred with respect to a time axis 504. FIG. 5 shows signals in cases (A) and (B) where the radio network controller (RNC) 204 transmits, to the wireless base station 206 (and the mobile terminal 208), the contents of a signal (transmission blocks) generated by the RNC 204 or received from the higher level switching equipment 201. (A) shows the case where transmission is performed to each mobile terminal within the transfer rate guaranteed in the system. (B) shows the case where the transfer rate of a control channel 1 is increased, but the transfer rates of the other control channels are maintained as is.

First, transmission blocks to be transmitted in each control channel are accumulated (buffered) in the radio network controller 204. As for the control channel 1 (CH1), transmission blocks 1-1 through 1-4 are consecutively received or created, and then transmission blocks 1-5 through 1-6 are received and accumulated in preparation for transmission. As for the control channel 2 (CH2), transmission blocks 2-1, 2-2 and 2-3 are intermittently received, and each of them are accumulated in preparation for transmission. As for the control channel 3 (CH3) and the control channel 4 (CH4), similarly, transmission blocks 3-1 through 3-4 and 4-1 through 4-4 are received and accumulated, respectively. It should be noted that, for simplicity, the timings for buffering transmission blocks are illustrated as if they are the same as the timings for transmitting the transmission blocks. However, actually, each transmission block is transmitted after a predetermined time period elapses since being buffered.

First, in the case of (A), it is possible to transfer a signal in each control channel with the use of the minimum band Tw that is guaranteed in the system. As shown in FIG. 5, if there are data, transmission blocks of each control channel may be transmitted at intervals of 40 ms at latest. In this regard, a technique according to an embodiment of the present invention and the conventional technique (FIG. 1) offer similar results.

Next, a description is given of the case where the transfer rate of the control channel (CH1) is increased. Determination of whether to increase the transfer rate of the control channel 1 may be based on, for example, whether the data amount (traffic volume) to be transmitted via the control channel 1 exceeds a predetermined value. The transfer rate of the control channel 1 may be increased in the case where a predetermined control step is started or the case where a predetermined message is transmitted, such as when a call is established or released. In any case, it is preferable to increase the transfer rate in the case where the number of control steps performed via the control channel with respect to a mobile station is increased or the amount of control signals transferred is increased. The determination is made by the first determination means 330 of the control signal processing means 310, and is communicated to the parameter management means 324.

Preferably, it is further determined in the second determination means 332 whether there is a communication resource that will be unused in the future in the control channels other than the control channel 1. It is possible to find a communication resource that will be unused based on the transfer rate currently set to each control channel and the amount of data of transmission blocks accumulated in each control channel for actual transmission. For example, assuming fixed terms T1, T2, T3 and T4, each having a time length of 40 ms, transmission of the transmission block 2-1, which is transferred via the control channel 2, is completed during the term T1 (the data size thereof is that much). Hence, communication resources reserved for the control channels 2, such as blocks 506 indicated by dotted lines, will be unused during the terms T2 and T3. Similarly, as for the control channels 3 and 4, it turns out that communication resources will be unused during the terms T2 and T3. It is not essential that the fixed term assumed for finding unused communication resources matches the transmission interval in the case of the guaranteed minimum transfer rate, such as 40 ms, and another fixed term may be assumed as well.

By allocating, to the control channel 1, the communication resources for the control channel 2 and the control channel 3 found to be unused in the aforementioned manner, signal transfer as shown in (B) is performed. That is, in the Term T1, transmission blocks are transmitted at intervals of 40 ms in the control channel 1. In the terms T2 and T3, transmission blocks are transmitted at intervals of 10 ms in the control channel 1. Transmission of up through the transmission block 1-6 is completed within the term T3. Thereby, compared to the case of (A), it is possible to complete transmission in the control channel 1 within a half period.

Preferably, in the communication resource management device 300, a positive decision result (indicating necessity of modification and that there will be unused resources in the future) of the first determination means 330 and the second determination means 332 is communicated to the allocation means 316, and what to transmit at what timing is set. For example, as for the control channel 1, transmission blocks are transmitted at intervals of 40 ms in the term T1. In the term T2, transmission blocks are not transmitted at intervals of 40 ms, but the transmission blocks 1-2, 1-3 and 1-4 are transferred at intervals of 10 ms with the use of communication resources for the control channels 2 and 3. Also in the term T3, the transmission blocks 1-5 and 1-6 are transferred at intervals of 10 ms. In order to realize such transfer, various parameters are adjusted. The parameter management means 324 send instructions to the transmission time interval/size adjusting means 322 such that the minimum transfer rate guaranteed in the system is realized in the term T1 and a higher transfer rate is realized in the terms T2 and T3. In accordance with the instructions, the transmission time interval/size adjusting means 322 adjust the transmission time intervals or data size.

The set items such as transmission time interval TTI and the transmission data size TFS, which are varied by the control signal processing means 310 and the allocation means 316, are communicated to a corresponding wireless base station and a wireless base station and a mobile terminal that are related to a control channel to be varied. Then, it becomes possible for the radio network controller to perform communications via a control channel having a newly set transfer rate. It should be noted that, in this case, the transmission band management means 312 need not specifically manage allocation of communication resources in each control channel between a mobile terminal and a wireless base station. As mentioned above, the transmission band management means 312 control allocation and releasing of communication resources for control channels with respect to mobile terminals that are used in the mobile communication system. Hence, the transmission band management means 312 have only to recognize how much unused bands are left in the entire system. Different from conventional techniques, in this embodiment, if the number (N) of mobile terminals performing communications with the use of control channels is not changed, the transmission bands 402 (=N×Tw) for control channels used in the entire system are not changed. Thus, the unused bands 406 are not changed as well. The control signal processing means 310 and the allocation means 316 can determine how to allocate transmission bands in the transmission bands 402 for control channels, without using the transmission band management means 312. Further, the radio network controller may unilaterally transmit varied set items to a mobile terminal before starting variation of a wireless base station, and may vary the transfer rate in a control channel without transmitting a signal to and/or receiving a signal from the mobile terminal.

In the example shown in FIG. 5, the description has been given of the rate in which transmission is made at intervals of 40 ms and the rate in which transmission is made at intervals of 10 ms. However, the number of kinds of transfer rate may be increased. For example, options for performing transmission at intervals of 10 ms, 20 ms, 30 ms and 40 ms may be provided and suitably selected.

The transmission time interval, such as 10 ms and 40, ms may be associated with a delay time until a signal is buffered and transmitted, i.e., quality of service (QoS). For example, a signal received immediately after the transmission cycle of 10 ms is buffered for approximately 10 ms and transmitted at the next transmission timing. Thus, the delay time of a signal is different between the case where the transmission time interval is 10 ms and the case where the transmission time interval is 40 ms, and the QoS is also different between these cases. Hence, it is advantageous to divide the QoS realized in the system into two or more classes in advance (for example, the transmission time interval TTI=40 ms may represent a first class QoS1, and the transmission time interval TTI=10 ms may represent a second class QoS2), to select an appropriate class according to need, and to adjust the transfer rate in a control channel, thereby managing allocation of frequency bands. For example, the QoS may also be used in an operation of a management timer in an ARQ (Automatic Repeat Request), and may be used for signal processing other than transmission band allocation.

Meanwhile, even with the conventional technique as described with reference to the right side of FIG. 1, it is possible to increase the rate in the control channel 1 as shown in (B) of FIG. 5. However, in such a case, the unused bands will be reduced in return for increasing the rate in the control channel. It should be noted that, according to an embodiment of the present invention, under the condition that unused communication resources in control channels are found, it becomes possible to increase the rate in any of the control channels without reducing the unused bands.

On the other hand, when the decision result in the second determination means 332 of the communication resource management device 300 is negative, it implies that there are no such communication resources that are not going to be used during a predetermine term such as T2 and T3 in the communication resources for the control channels other than the control channel 1. It is desirable that all control channels guarantee that communications may be performed at a predetermined communication rate or a higher communication rate. It is undesirable for the communication rate of another control channel having data to be transmitted to be reduced for increasing the communication rate of a certain control channel. Accordingly, as shown in FIG. 6, in the case where each control channel includes a large amount of data to be transmitted and is congested, even if the decision result in the first determination means 330 indicates necessity of variation, the second determination means 332 send notification that there will be no resources available. Thus, the allocation means 316 do not approve variation of the transfer rate, and each control channel transmits its own transmission blocks at the minimum rate guaranteed in the system. In the example shown in FIG. 6, each of the control channels 1 through 4 transmits its own transmission blocks at intervals of 40 ms.

In the above description, the transmission transfer interval (TTI) is adjusted so as to vary the transfer rate of a control channel. However, the data size (TFS) of data to be transmitted at a time as well as the transmission time interval may be varied so as to vary the transfer rate.

Figure 7:
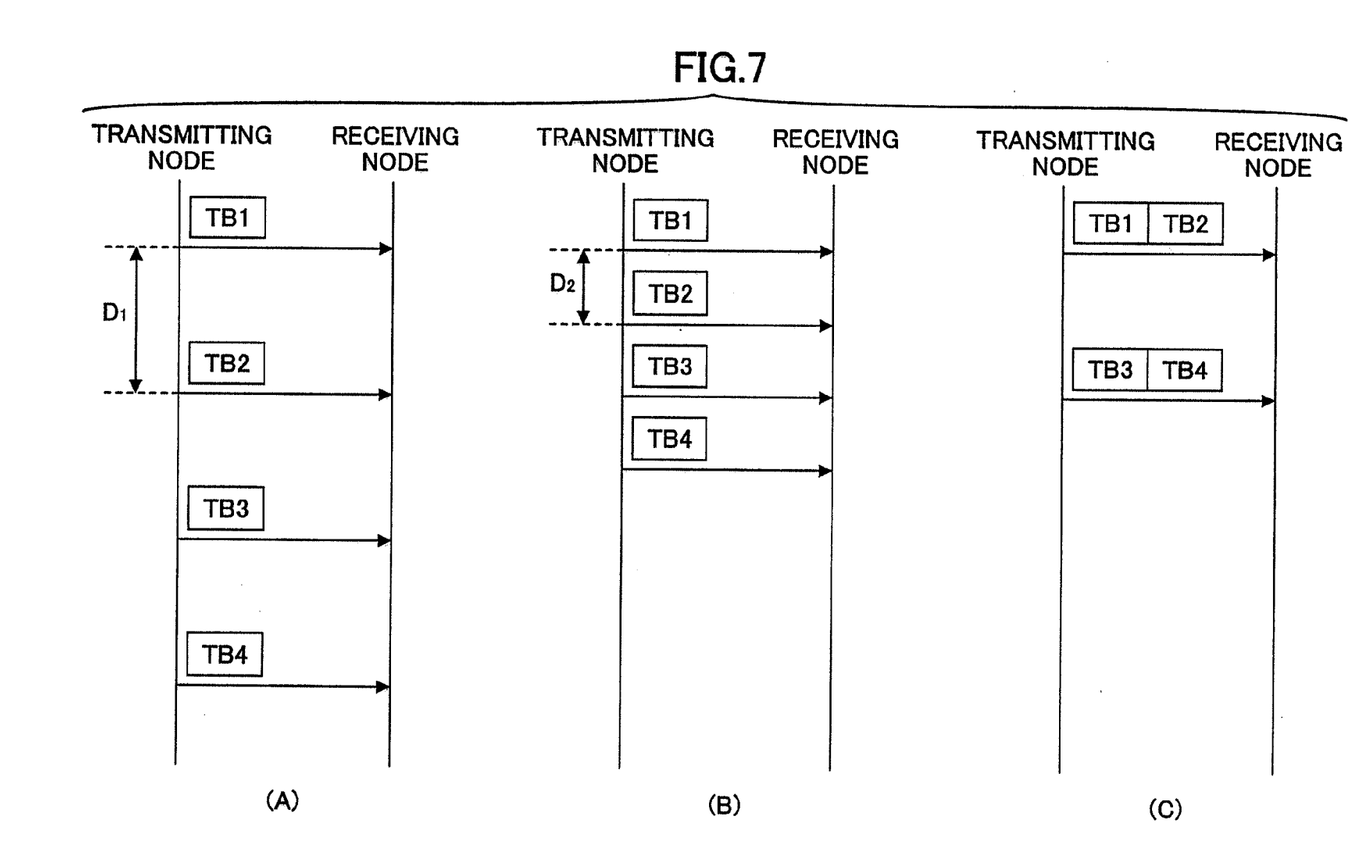
FIG. 7 is a timing chart showing relationships among a transfer rate, a transmission time interval (TTI), and a transmission signal size (TFS)

FIG. 7 shows conditions where transfer rates are varied by varying the transmission time intervals or the data size. Each timing chart shows a condition where transmission blocks TB1 through TB4, each having a predetermined data size, are transferred from a transmitting node to a receiving node. In the timing chart indicated by (A), one transmission block is transferred at transmission time intervals of a first term D1. In the timing chart indicated by (B), one transmission block is transferred at transmission time intervals of a second term D2, which is a half of the first term D1. In this manner, a transfer rate twice the transfer rate in the case indicated by (A) is achieved. In the timing chart indicated by (C), two transmission blocks are transferred at transmission time intervals of the first term D1. Also in this manner, it is possible to achieve a transfer rate twice the transfer rate in the case indicated by (A). Further, though not shown in the figure, it is also possible to further increase or decrease the transfer rate by adjusting both transmission time interval and data size.

As mentioned above, according to this embodiment, it is possible to effectively use communication resources by varying the transfer rate in a control channel related to a mobile terminal in accordance with a communication condition. Additionally, according to this embodiment, it is possible to vary the transfer rate in a control channel related to each mobile terminal without varying the sum of transmission bands for control channels.

In the above description, the transfer rate of only one control channel is increased. However, the transfer rates of a greater number of control channels may be increased. Further, a particular description has not been given of variation in the wireless zone between a wireless base station and a mobile terminal due to variation in a transfer rate (e.g., twice). However, in the case where, for example, wireless communications are being performed with the use of a spread code A (spread rate x), it is possible to vary a transfer rate in the wireless zone by newly assigning a spread code B (spread rate x).

(Second Embodiment)

Figure 8:
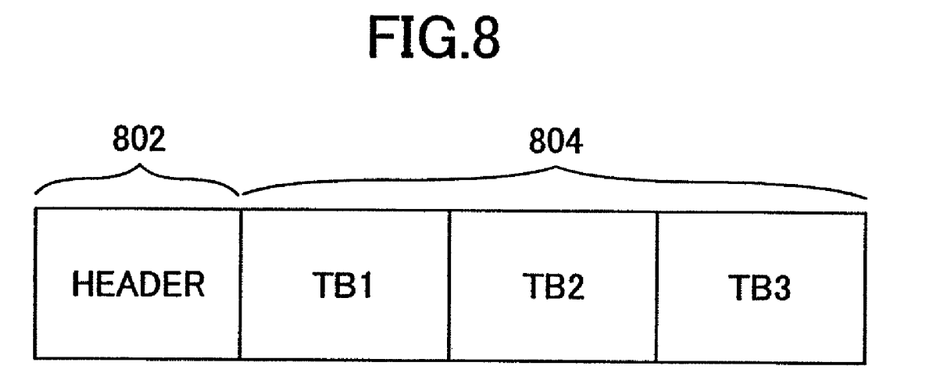
FIG. 8 is a data diagram showing a general signal format.

Data transfer from a transmitting node to a receiving node is performed such that a signal of a predetermined data size, such as 1 block or 2 blocks, is transferred at predetermined transmission time intervals (TTI) such as 10 ms or 40 ms. Generally, the format of a signal transmitted from and received by a radio network controller (RNC) is as shown in FIG. 8 and includes a header 802 and a subsequent payload 804. The payload 804 includes transmission blocks 1, 2, 3, ... to be transferred. The header 802 includes a transport format indicator (TFI), which indicates the number or amount of the transmission blocks (TB) following the header. Although an actual TFI is a value related to the data amount of transmission blocks, the actual TFI is not always a numeric value directly representing the number of transmission blocks. However, for convenience of explanation, it is assumed that a TFI directly represents the number of transmission blocks. For example, when TFI=3, then 3 transmission blocks (TB1, TB2, TB3) are included in a payload as shown in FIG. 8. In addition, the data amount of a transmission block is also determined in advance, which may be, for example, 40 bytes/packet.

When transferring transmission blocks, of course the transmission blocks are transferred at predetermined transmission time intervals by using a signal format as mentioned above. However, conventionally, even when there is no transmission block to be transmitted, certain signals have been transmitted at transmission time intervals. For example, when establishing a call, relatively many signals are transferred. However, in a stabilized period after a connection is established, the number of transmission blocks to be transferred by using a control channel is significantly decreased. In this case, the signal may not be transferred at transmission cycles defined by a TTI. However, in such a case, there is concern that the transmitting node and the receiving node may not be synchronized. Thus, even if there is no transmission block to be transmitted, a special signal (or NoDATA signal), such as a signal having only the header 802, is transferred at transmission cycles. In the case where a wireless base station has not received any signal during a predetermined time frame, the wireless base station can maintain synchronization between nodes by transmitting a time adjustment (TA) signal. The TFI included in NoDATA indicates that the number of transmission blocks is 0 (TFI=0).

It is contemplated to apply such a technique to the above-mentioned first embodiment. For example, it is assumed that a first mode where transmission is performed at the minimum transfer rate of 40 ms and a second mode where transmission is performed at the maximum transfer rate of 10 ms are prepared. In this case, in the first mode, transmission blocks TB or special signals are transmitted at intervals of 40 ms. In the second mode, transmission blocks TB or special signals are transmitted at intervals of 10 ms.

However, the intended purpose of the second mode is high speed transfer of transmission blocks. Thus, when there is no transmission block to be transmitted, it is impractical to perform high speed transfer by increasing traffic by using frequency resources for another control channel.

Hence, in this embodiment, in addition to a transmission time interval for transferring transmission blocks TB, another transmission time interval is prepared for transferring special signals (NoDATA signals), and the latter is set longer than the former. In the above-mentioned example, transmission blocks are transmitted at intervals of 10 ms in the second mode. However, when there is no transmission block, special signals (NoDATA signals) can be transmitted at intervals of 40 ms. Additionally, in the first mode, transmission blocks and special signals are transmitted at intervals of 40 ms.

Figure 9:
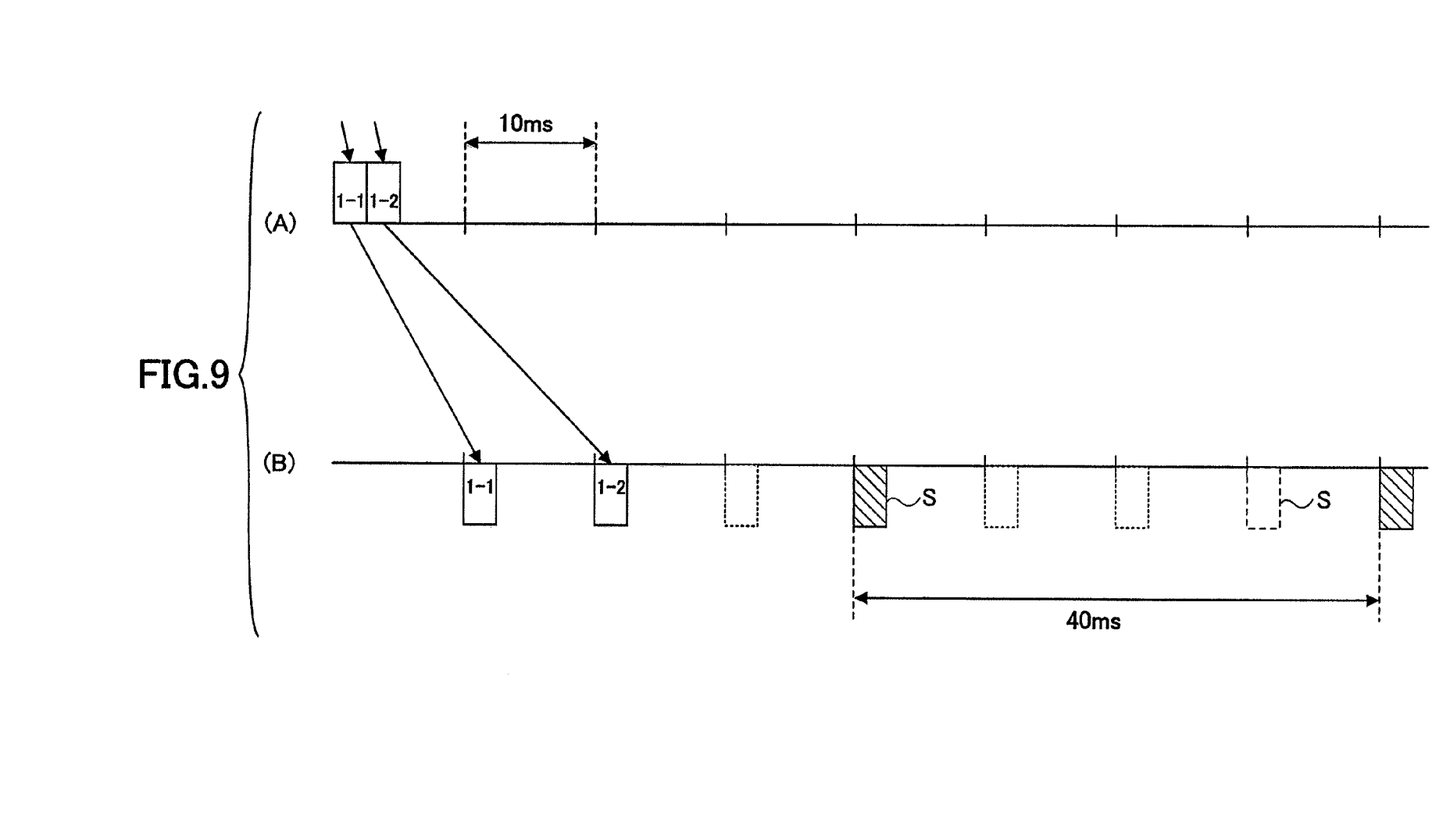
FIG. 9 is a timing diagram showing signal transfer in downlinks according to a second embodiment.

FIG. 9 is a timing chart showing signal transfer in a downlink according to the second embodiment. FIG. 9 shows a condition (A) where a wireless network controller (RNC) (more properly, the communication resource management device 300) receives control signals (transmission blocks) 1-1 and 1-2 from the higher switching equipment 201, and a condition (B) where the radio network controller transmits the control signals 1-1 and 1-2 to a wireless base station under the radio network controller. For convenience of explanation, the communication resource management device 300 is set to operate in the second mode, which is the high speed mode. Thus, as indicated by (B), the transmission blocks 1-1 and 1-2 to be transmitted are transmitted to the wireless base station at transmission time intervals of 10 ms. Since there are no more transmission blocks, after the transmission blocks 1-1 and 1-2 are transmitted, special signals S are transmitted at intervals of 40 ms. The special signals S are created by special signal generation means 336 under management of the parameter management means 324 in the allocation means 316, and are supplied to the transmission time interval/size adjusting means 322. It should be noted that the dotted lines shown in (B) represent special signals created and transmitted when TTI for the special signals S are not prepared.

In the example shown in the figure, the special signals S are transmitted at intervals of 40 ms from a predetermined time point that is set for the special signals S. However, this is not necessary for the present invention, and transmission may be made from an arbitrary time point after the transmission block 1-2 is transmitted. For example, transmission may be made at intervals of 40 ms after the last transmission block (1-2) is transmitted.

Figure 10:
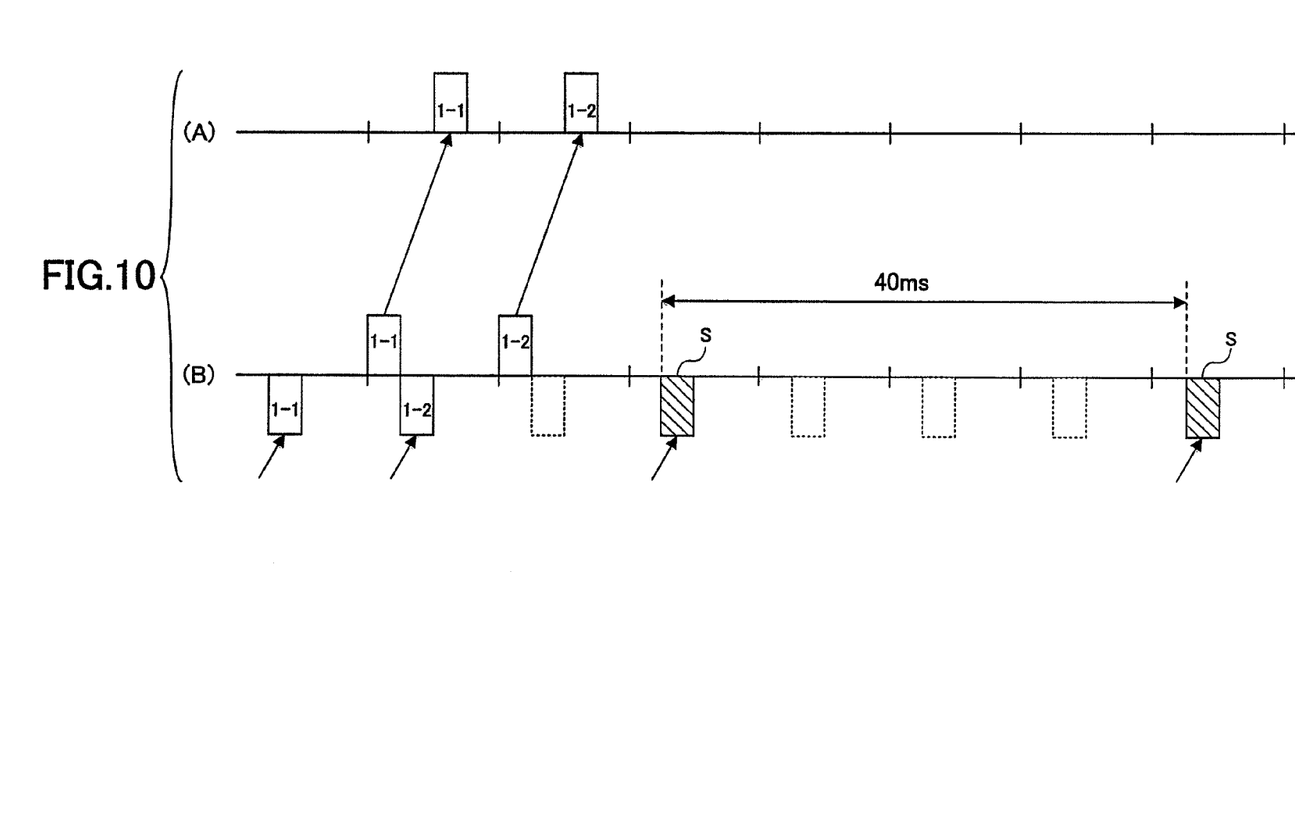
FIG. 10 is a timing diagram showing signal transfer in uplinks according to the second embodiment.

FIG. 10 is a timing diagram showing signal transfer in uplinks according to the second embodiment. FIG. 10 shows the case (B) where the communication resource management device 300 receives control signals (transmission blocks) 1-1 and 1-2 from the mobile terminal 208 and the wireless base station and the case (A) where these are transmitted to the switching equipment 201. Also in this case, the communication resource management device 300 is set to operate in the above-mentioned second mode, which is the high-speed mode. Accordingly, as shown in (A), the received transmission blocks 1-1 and 1-2 are transmitted to higher switching equipment at intervals of 10 ms. Although there are no more transmission blocks, the communication resource management device 300 receives special signals S at intervals of 40 ms even after receiving the transmission block 1-2. Further, the dotted lines shown in (B) represent special signals to be received when TTI for the special signals S are not prepared. In the example shown in the figure, the special signals S are transmitted at intervals of 40 ms from the time point set for the special signals S. However, as described with reference to FIG. 9, transmission may be made from another time point.

According to this embodiment, in addition to the effect of the first embodiment, which increases the speed of the control channel, there is no need to frequently transfer special signals such as NoDATA. Hence, it is possible to use communication resources related to a decrease in traffic for other communications. Thus, it is possible to more effectively use communication resources.

The present invention is not limited to the specifically disclosed embodiments, and variations and modifications may be made without departing from the scope of the present invention.

The present application is based on Japanese priority application No. 2002-246655 filed on Aug. 15, 2002, the entire contents of which are hereby incorporated herein by reference.

What is claimed is:

1. A communication resource management device managing transmission bands for a plurality of control channels between a base station and a plurality of mobile terminals, the control channels allowing transmission with a predetermined period, the communication resource management device comprising:
an allocation part configured to unilaterally apply one of the plurality of control channels, used for transmission of a first control signal to a first one of the plurality of mobile terminals at a first time according to the predetermined period, to transmission of a second control signal to a second one of the mobile terminals without any signal transmission between the base station and the second mobile terminal, when using the one of the control channels for transmitting the second control signal to the second mobile terminal at a second time subsequent to the first time according to the predetermined period,
wherein the one of the control channels is not used for the transmission of the second control signal to the second mobile terminal before being applied to the transmission of the second control signal to the second mobile terminal.

2. A control channel allocation method in a mobile communication system comprising a communication resource management device managing transmission bands for a plurality of control channels between a base station and a plurality of mobile terminals, the control channels allowing transmission with a predetermined period, the control channel allocation method comprising:
the communication resource management device unilaterally applying one of the plurality of control channels, used for transmission of a first control signal to a first one of the plurality of mobile terminals at a first time according to the predetermined period, to transmission of a second control signal to a second one of the mobile terminals without any signal transmission between the base station and the second mobile terminal, when using the one of the control channels for transmitting the second control signal to the second mobile terminal at a second time subsequent to the first time according to the predetermined period, wherein the one of the control channels is not used for the transmission of the second control signal to the second mobile terminal before being applied to the transmission of the second control signal to the second mobile terminal; and
the second mobile terminal receiving the second control signal transmitted through the one of the control channels.

3. A mobile terminal used in a mobile communication system comprising a communication resource management device managing transmission bands for a plurality of control channels between a base station and a plurality of mobile terminals, the control channels allowing transmission with a predetermined period, the mobile terminal comprising:
a receiving part configured to receive a control signal transmitted through one of the plurality of control channels,
wherein the one of the control channels is used for transmission of another control signal to another mobile terminal at a first time according to the predetermined period, and is unilaterally applied by the communication resource management device to the transmission of the control signal to the mobile terminal without any signal transmission between the base station and the mobile terminal, when using the one of the control channels for transmitting the control signal to the mobile terminal at a second time subsequent to the first time according to the predetermined period, and
wherein the one of the control channels is not used for the transmission of the control signal to the mobile before being applied to the transmission of the control signal to the mobile terminal.

* * * * *